July 5, 1960 H. P. WEHDE ET AL 2,944,113

SYSTEM FOR BROAD-BAND RECORDING

Filed July 10, 1956 2 Sheets-Sheet 1

Inventors:
Heinz Wehde & Paul Gerhard Rothe
By Eric D. Frankel
Patent Agent

Inventors:
Heinz Wehde & Paul Gerhard Rothe
By Eric D. Frankel
Patent Agent

United States Patent Office 2,944,113

Patented July 5, 1960

2,944,113

SYSTEM FOR BROAD-BAND RECORDING

Heinz P. Wehde and Paul G. Rothe, Hannover, Germany, assignors to Telefunken G.m.b.H., Berlin, Germany Filed July 10, 1956, Ser. No. 596,988

Claims priority, application Germany July 20, 1955

5 Claims. (Cl. 179—15.55)

The present invention relates to a method and system for transposing a signal covering a wide frequency band into two or more signals each covering a narrower band especially suitable for multi-track recording on a signal carrier such as a magnetic tape or the like; and for retransposing these narrower-band signals to the original wide-frequency signal wherein the proper amplitudes and phases are retained.

The problem of converting a frequency band into several other frequency bands, each occupying a lower position in the frequency spectrum, may arise in different fields relating to transmission technique, for example, if only cable is available, to transmit a very wide frequency band, such as a video signal, such cable having a cutoff frequency which renders the cable unsatisfactory to transmit the band width of the original signal.

Primarily, the above problem arises when video signals are to be recorded on magnetic carriers. In the latter case, the high frequencies of the signal can be recorded on the magnetic carrier only at high carrier or tape velocities. As a result of this, only relatively short programs or parts thereof can be recorded on a magnetic tape if a single track system is used due to the limited diameter of the magnetic tape reels. Therefore, it is desirable to transpose the wide frequency band of the signal to be recorded into several narrower component-frequency bands and to record the latter on adjacent tracks of the magnetic tape at lower velocities. In such case, it is a requirement that neither amplitude nor phase distortion occurs at the boundaries of the component-frequency bands, because such distortion would be noticeable as distortions in the video picture produced. Thus, an attempt to split up the wide frequency band into several partial frequency bands by means of conventional low-, band-, or high-pass filters would involve considerable difficulty.

It is an object of the present invention to obviate these difficulties by transposing a signal extending over a wide frequency band into two signals each covering a frequency band occupying a lower position in the frequency spectrum and having a narrower band-width; and to provide simple means for retransposing said signals into the original frequency band, whereby amplitude and phase distortions do not occur at any place in this frequency band.

It is another object of this invention to provide a system wherein the transposed signals each occupies half the band-width of the original signal.

It is a still further object of the invention to provide two modulators for the signal transposition, said two modulators being adapted to modulate the signal with two carrier oscillations, the frequencies of which are equal and lie within the wide frequency band of the original signal, preferably near the center of the signal band, and wherein the phases of these oscillations are displaced 90°.

It is an additional object of this invention to provide for the retransposition two other modulators adapted and arranged to modulate with the lower side bands of the two transposed signals oscillations which equal those used in the transposition step with respect to frequency and phase, whereupon the modulation products of these two modulators may then be added to one another in a summing circuit. The total thus obtained represents exactly the original signal, as will be shown below. For the sake of simplicity, the same modulators may be used for both transposition and retransposition purposes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
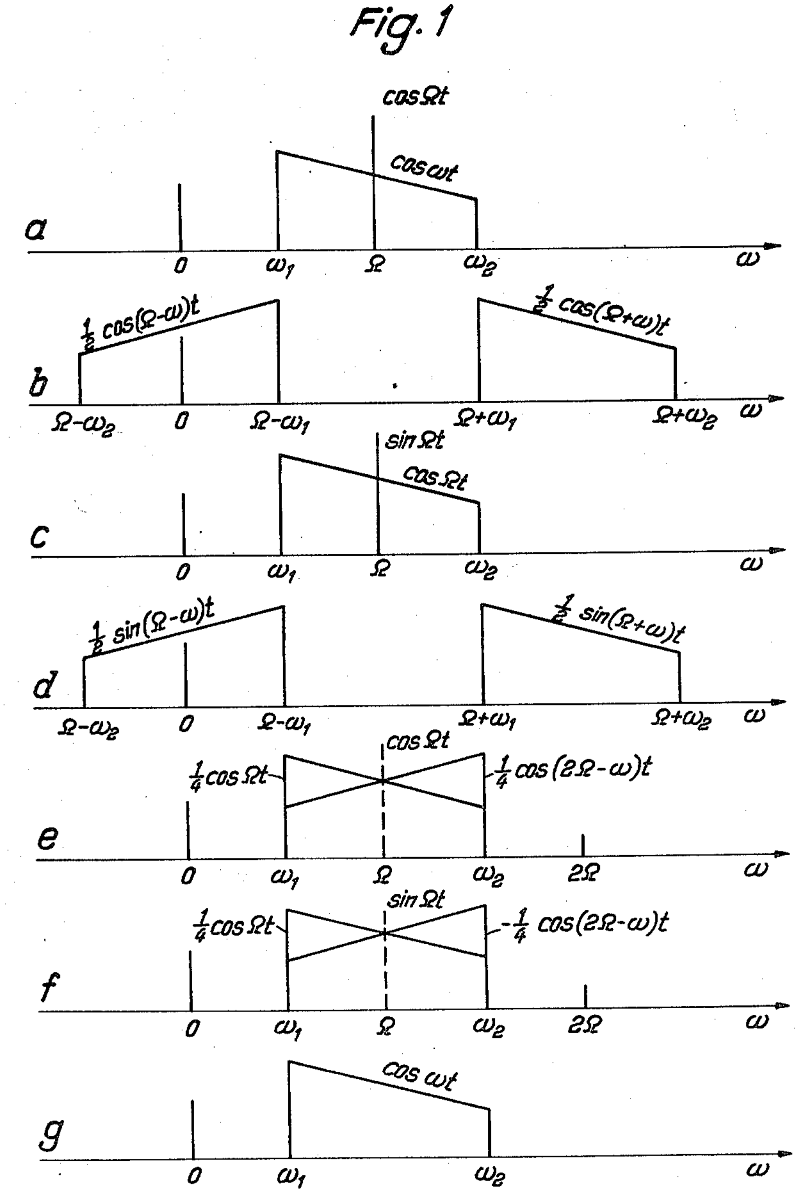
Figure 1 shows a series of frequency diagrams, with reference to which the principle of this invention will be explained.

In the diagram of Figure 1, the frequency bands and oscillation frequencies are plotted in the vertical direction. Diagram *a* in Figure 1 illustrates the wide frequency band to be transmitted. This frequency band, denoted by $\cos \omega t$, is modulated in a modulator, for example, a ring modulator, with the frequency $\Omega$ indicated as a vertical line in this diagram. This modulator simultaneously suppresses the carrier frequency. The phase of this oscillator frequency is indicated by $\cos \Omega t$, in the diagram, and the oscillator frequency $\Omega$ lies in the center of the frequency band to be converted. By simple mixing in the modulator, the following modulation product is obtained:

$$(1) \quad \cos \Omega t \cos \omega t = \tfrac{1}{2} \cos (\Omega - \omega)t + \tfrac{1}{2} \cos (\Omega + \omega)t$$

Thus, two side bands are obtained which are shown in diagram *b* of Figure 1, while the carrier $\Omega$ is eliminated. The amplitude coefficients are omitted in the foregoing equation and in the subsequent equations for the sake of clarity, because these coefficients are not necessary to understand the operation of the new method and system. For example, the amplitude of the signal frequency $\omega$ is assumed to be unity between the limits $\omega_1$ and $\omega_2$ and zero for all other frequencies $\omega$. In addition, it is specifically assumed in Figure 1 that $\Omega = 2\omega_1$, and $\omega_2 = 3\omega_1$. This particular frequency selection refers to an example which will be explained below.

In diagram *b* of Figure 1, the lower side band $\tfrac{1}{2} \cos (\Omega = \omega)t$ appears to include some negative frequencies, since $\omega$ sometimes assumes values greater than $\Omega$. The frequency occurring in the modulated product then equals the absolute value of the negative frequency. The upper side band $\tfrac{1}{2} \cos (\Omega + \omega)t$ is not of interest in the present case, because it cannot be reproduced by recording on a magnetic tape, due to the limited frequency transmitting properties of the magnetic head. Thus, a filter having a cutoff frequency between $\omega_1$ and $\omega_2$ may be inserted to cutoff the upper side band so that a signal will be obtained having modulation products comprising only frequencies between zero and $\omega_1$, whereby the band width of the frequency is ½ that of the original signal.

The same original signal $\cos \omega t$ $(\omega_1 < \omega < \omega_2)$ is mixed by multiplication in a second modulator with the same frequency $\Omega$ as in the first modulator, the carrier frequency in the second modulator being 90° displaced in phase with respect to $\cos \Omega t$ and, therefore, being designated as $\sin \Omega t$. These conditions are indicated in diagram *c* of Figure 1, while diagram *d* of Figure 1 shows the modulation products (2) $\sin \Omega t \cos \omega t = \frac{1}{2} \sin (\Omega - \omega t) + \frac{1}{2} \sin (\Omega + \omega) t$ The side bands $\frac{1}{2} \sin(\Omega - \omega)t + \frac{1}{2} \sin(\Omega + \omega)t$ are located in the diagram *d* at the same locations as the side bands of the modulation products in the first modulator shown in diagram *b* and are distinguished from them merely in phase.

In the retransposing step, the lower side bands of the signals, shown in the diagrams *b* and *d* of Figure 1, are mixed with the carrier frequencies respectively assigned to them. Thus, in the first channel, there are obtained:

(3) $\cos \Omega t \cdot \frac{1}{2} \cos (\Omega - \omega) t = \frac{1}{4} \cos \omega t + \frac{1}{4} \cos (2\Omega - \omega) t$ and in the second channel:

(4) $\sin \Omega t \cdot \frac{1}{2} \sin (\Omega - \omega) t = \frac{1}{4} \cos \omega t - \frac{1}{4} \cos (2\Omega - \omega) t$ These modulation products for the first channel are shown in diagram *e* of Figure 1 and those for the second channel in diagram *f* of Figure 1. If the two modulation products, i.e., the right sides of the Equations 3 and 4 are added, the original wide-band signal $\cos \omega t$ with an amplitude coefficient ½ is again obtained. It is important that in the retransposition step modulators with carrier suppression characteristics are used so that the carrier is no longer present in the output, as shown in diagram *g* of Figure 1, because, otherwise, the video picture would be distorted by this carrier $\Omega$ lying within the signal frequency band. Therefore, double push-pull modulators, in particular ring modulators are suitably used. Furthermore, it is essential that a multiplying type mixing method be used, so that spurious mixing products will not be present in the modulation products.

The circuit system according to the invention was described in the foregoing as an example of specifically selected frequencies, i.e. $\Omega = 2\omega_1$, $\omega_2 = 3\omega_1$, chosen for the sake of simplicity. It can be easily proven that this new kind of modulation can be carried out in the case of any other selection of frequency values. A decreased band width of the transposed signals with respect to the original signal band width is obviously obtained only when $\omega_1 < \Omega < \omega_2$, and one half of the band width is obtained only when $\Omega$ is exactly in the center between $\omega_1$ and $\omega_2$. The same results are obtained when $\omega_1$ is substantially smaller than ½ of $\Omega$. Practical difficulties are encountered when $\omega_1$ becomes zero, because then the frequency band to be transposed contains all the frequencies down to zero. In the latter case, the separation of the upper side band from the lower side band is difficult, because the lower frequency limit of the upper side band coincides with the upper frequency limit of the lower side band and simultaneously with the carrier frequency $\Omega$. Consequently, if it is desired to transpose a frequency band, such as the video signal band in a television system for the purpose of multi-track recording on a magnetic carrier in accordance with the invention, this video frequency band should first be converted to a higher frequency range in a manner known per se by means of a converter, or the frequencies below $\omega_1$ should be separated from the higher frequencies by a special filter and should be separately recorded on a third track. Such filter should not introduce amplitude or phase distortion into the signal at the band limit $\omega_1$.

Figure 2:
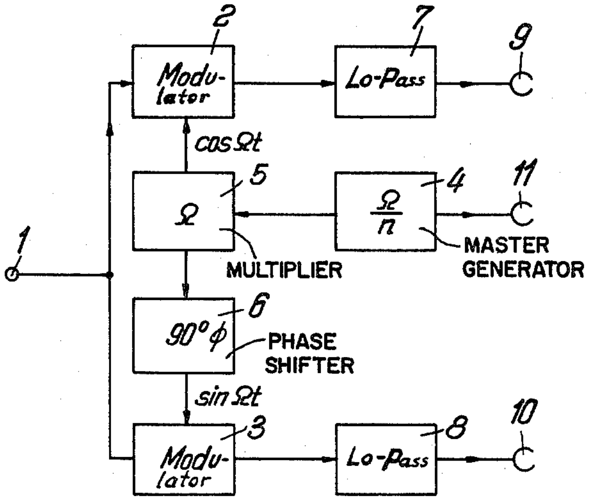
Figure 2 is a block diagram illustrating an embodiment of a signal transposing apparatus according to the invention.

The block diagram of Figure 2 shows schematically an embodiment of a signal transposing apparatus according to the invention. The signal to be transposed is applied via a terminal 1 to modulators 2 and 3. A subharmonic $\Omega/n$ of the carrier frequency $\Omega$ is supplied from a master generator 4 to a multiplier 5 in which the carrier frequency is directly fed from the multiplier 5 to the modulator 2. The phase of the carrier frequency is assumed in this example to be represented by $\cos \Omega_t$. In addition to this, the frequency $\Omega$ is supplied to the modulator 3 via a phase shifter 6 displacing the phase 90°. This phase shift is represented as $\sin \Omega_t$. The modulation products are supplied to the recording heads 9 and 10 of a magnetic tape recording apparatus via low-pass filters 7 and 8, respectively, which may not be essential. Furthermore, a third recording head 11 is provided to supply the master frequency $\Omega/n$ of the generator 4, so as to record said master frequency on a third track of the magnetic tape. In the present case, $\Omega/n$ was selected as the master frequency because the frequency $\Omega$ itself is in a frequency range which can no longer be recorded nor reproduced by a magnetic tape recording apparatus.

Figure 3:
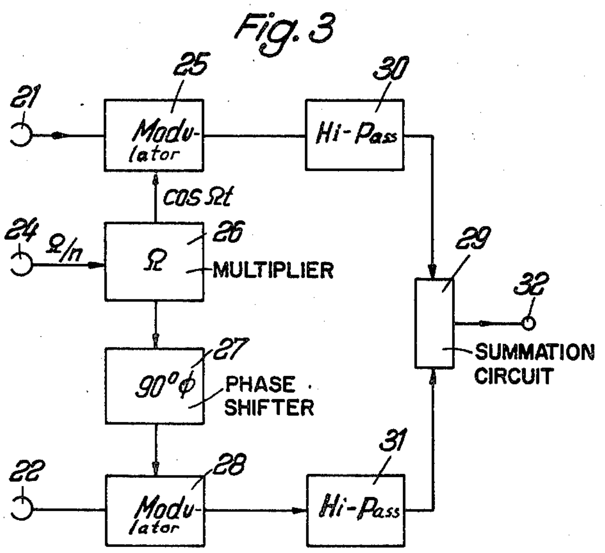
Figure 3 shows a block diagram of an embodiment of a signal retransposing apparatus according to the invention.

According to the invention, there is shown in Figure 3 the circuit of an apparatus adapted to retranspose the recorded signals to the original frequency range. This apparatus comprises substantially the same components in reverse order as those in the recording apparatus of Figure 2. The cosine signal is picked up by means of a magnetic head 21 and the sine signal by means of a magnetic head 22, while the master frequency is picked up by means of a magnetic head 24. The cosine signal is mixed by multiplying in a modulator 25 with a carrier frequency $\cos \Omega_t$ produced in a multiplier 26, while the sine signal is mixed in a modulator 28 with a carrier frequency $\sin \Omega_t$ displaced 90° in phase by means of the phase shifter 27. The signals at the outputs of the modulators 25 and 28 are added together in a summation circuit 29. If need, high-pass filters 30 and 31 may be inserted in the system to suppress disturbing lower frequencies. The original signal fed to the input terminal 1 of Figure 2 appears again at the output terminal 32 of Figure 3. This signal may serve either to reproduce a video picture, or to modulate a transmitter, in which case, it may be desirable to add other picture components, as well as synchronizing pulses, etc.

We claim:

1. A system to transpose original signals covering a wide frequency band into two components each covering a narrower band-width and for recording the narrower band-width components on a recording medium, comprising a master oscillator for generating a frequency, phase-splitting network means for dividing said frequency into two quadrature carriers, said frequency lying within said wide frequency band, two mixers for respectively multiplying said original signals by one quadrature carrier to form two products, means for selecting the lower side-bands of each of said products, and means for simultaneously recording on said medium each of said lower side-bands and said master oscillator frequency.

2. In a system as set forth in claim 1, means for playing back and retransposing said recorded side-bands to reform said original signals comprising means for playing back from said medium said side-bands and said frequency, phase-splitting network means for dividing said frequency into two quadrature carriers, two mixers for respectively multiplying each side-band by the quadrature carrier having the same phase which originally formed it, and summation means for adding together the mixer outputs to reproduce the original signals.

3. In a system as set forth in claim 2, said mixers each comprising a balanced mixer, wherein the carrier is suppressed and only the side-bands are emitted.

4. A system to transpose original signals covering a wide frequency band into two components each covering a narrower band-width and for recording the narrower band-with components on a recording medium, comprising a master oscillator for generating a frequency, phase-splitting network means for dividing said frequency into two quadrature carriers, said frequency lying within said wide frequency band, two mixers for respectively multiplying said original signals by one quadrature carrier to form two products, means for selecting the lower side-bands of each of said products, means for selecting a sub-harmonic of said oscillator frequency, and means for simultaneously recording on said medium each of said lower side-bands and said sub-harmonic.

5. In a system as set forth in claim 4, means for playing back and retransposing said recorded side-bands to reform said original signals comprising means for playing back from said medium said side-bands and said sub-harmonic, multiplying means for regaining said frequency from said sub-harmonic, phase-splitting net-work means for dividing said frequency into two quadrature carriers, two mixers for respectively multiplying each side-band by the quadrature carrier having the same phase which originally formed it, and summation means for adding together the mixer outputs to reproduce the original signals.

References Cited in the file of this patent

UNITED STATES PATENTS

| | | |
|---|---|---|
| 2,117,739 | Miller | May 17, 1938 |
| 2,272,840 | Hammond et al. | Feb. 10, 1942 |
| 2,536,664 | Sinnett et al. | Jan. 2, 1951 |
| 2,751,437 | Hoeppner | June 19, 1956 |
| 2,766,325 | Di Toro | Oct. 9, 1956 |